Aug. 17, 1943.     E. F. PIERCE ET AL     2,326,883
VALVE TIMING DEVICE
Filed March 8, 1940     2 Sheets-Sheet 1
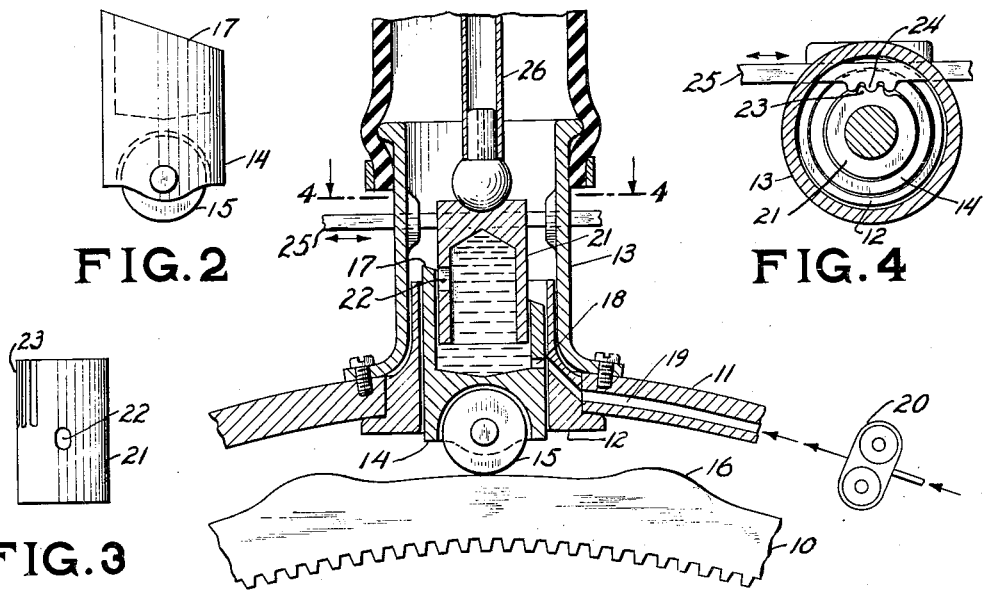
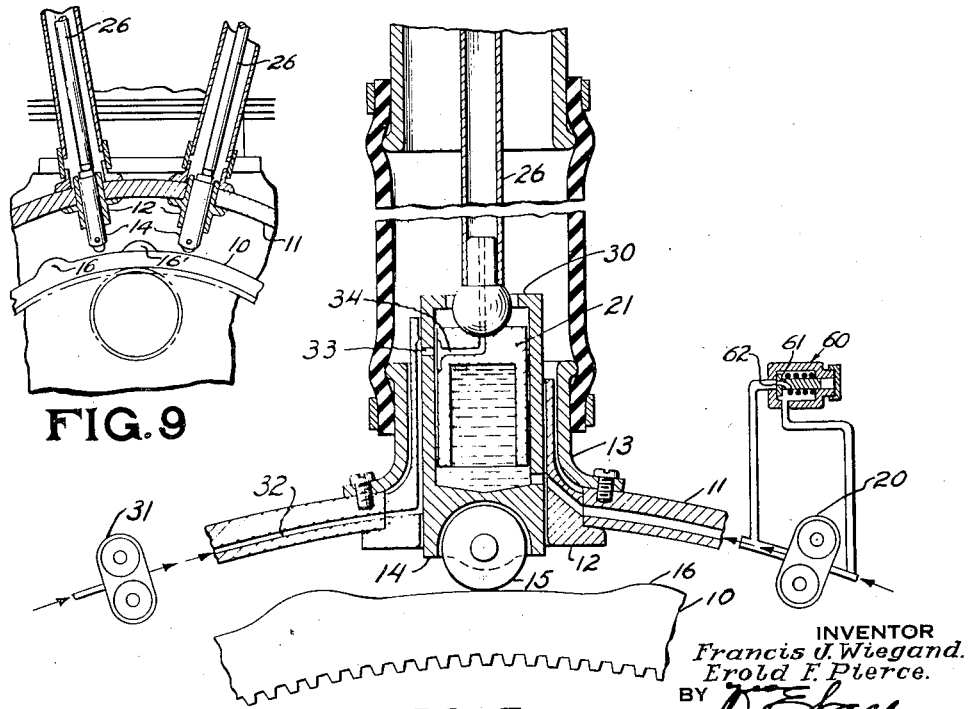
INVENTOR
Francis J. Wiegand.
Erold F. Pierce.
BY
ATTORNEYS Aug. 17, 1943.  E. F. PIERCE ET AL  2,326,883
VALVE TIMING DEVICE
Filed March 8, 1940  2 Sheets-Sheet 2

INVENTOR
Francis J. Wiegand.
Erold F. Pierce.
BY
ATTORNEYS

Patented Aug. 17, 1943

2,326,883

UNITED STATES PATENT OFFICE 2,326,883

VALVE TIMING DEVICE

Erold F. Pierce, Paterson, and Francis J. Weigand, Ridgewood, N. J., assignors to Wright Aeronautical Corporation, a corporation of New York Application March 8, 1940, Serial No. 322,962

6 Claims. (Cl. 123—90)

This invention relates primarily to internal combustion engines and is concerned in particular with improvements in the valve operating mechanism thereof.

In modern aircraft engines in particular, maximum power is produced when the intake and exhaust valves are so timed that there is substantial overlap of the opening of exhaust and intake valves at the top of the exhaust stroke, this overlap at times reaching a value of about 40°. With such overlap, the intake valve opens about 20° before top center while the exhaust valve closes about 20° after top center. Although such large overlap is advantageous during operation under power, it has a tendency to cause erratic engine operation during idling and to produce difficulties in engine starting. Accordingly, it is an object of this invention to provide means by which valve timing may be altered during engine operation and to so alter the valve timing that valve overlap is minimized under starting and idling conditions and is opened up under running conditions to the full amount necessary for maximum power. The above objectives may be obtained by selectively retarding intake valve opening timing or advancing exhaust valve closing timing, or both, under starting and idling conditions, and a further object of the invention consists in the provision of several alternate mechanisms by which the valve timing may be selectively varied.

Further objects of the invention consist in the provision of a mechanical valve timing altering mechanism and further, in the provision of hydraulic valve timing altering mechanism.

As herein disclosed, several alternate mechanisms are offered which illustrate the principles involved but the specific mechanisms are not to be construed as limiting the scope of the invention.

For a better understanding of the particular mechanisms shown, reference may be made to the drawings, in which:

Fig. 1 is a section through a cam follower and valve actuating device, comprising one alternative of the invention;

Figs. 2 and 3 are elevations of parts of the structure of Fig. 1;

Fig. 4 is a section on the line 4—4 of Fig. 1;

Fig. 5 is a section through a cam follower and valve actuating mechanism according to an alternate construction;

Fig. 9 is a fragmentary section through the valve tappet plane of an engine showing intake and exhaust tappets.

Since the invention is adapted for use in virtually any type of internal combustion engine using intake and exhaust valves, the engine per se has not been shown and only the cam follower mechanisms are disclosed since they are the mechanisms by which valve timing alteration may be secured.

Figure 8:
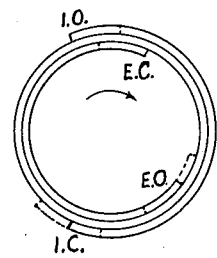
Fig. 8 is a valve timing diagram showing conventional valve overlap and possible alterations in valve timing afforded by the use of the invention.

Brief reference may be made to Fig. 8 wherein the solid line portions indicate normal valve timing, the initials I. O. denoting "intake valve opening" which is about 20° before top center; I. C. indicates "intake closing" which is about 20° after bottom center; E. O. represents "exhaust valve opening" which occurs from 60° to 90° before bottom center, and E. C. indicates "exhaust valve closing" which occurs about 20° after top center, these valve events being shown according to normal running conditions. It is apparent that the valve overlap, or the angle between I. O. and E. C. is around 40°; this angle may vary and is of course a factor of the design of an individual engine. Now, if intake opening timing be retarded or if exhaust valve closing timing be advanced as indicated by the dotted lines, valve overlap would be correspondingly reduced whereby improved starting and idling characteristics would result, but unless the overlap be increased after operation, fuel economy and high power operation would be interfered with.

Fig. 9 shows in general a cam 10 having lobes 16 and 16' engaging rollers of cam followers 14 and 14' slidable in guides 12 secured to an engine casing 11. The tappets include means for engagement with push rods 26 extending toward the cylinder valve gear through appropriate push rod housings.

In order to retard intake valve opening or to advance exhaust valve closing, two modes of approach are open: The slack or clearance in the valve operating system may be increased by which the valves open late and close early, or the cam followers may be shifted in or against the direction of rotation of the cam, with normal clearance, whereupon the valve would open late or early, respectively.

Figure 6:
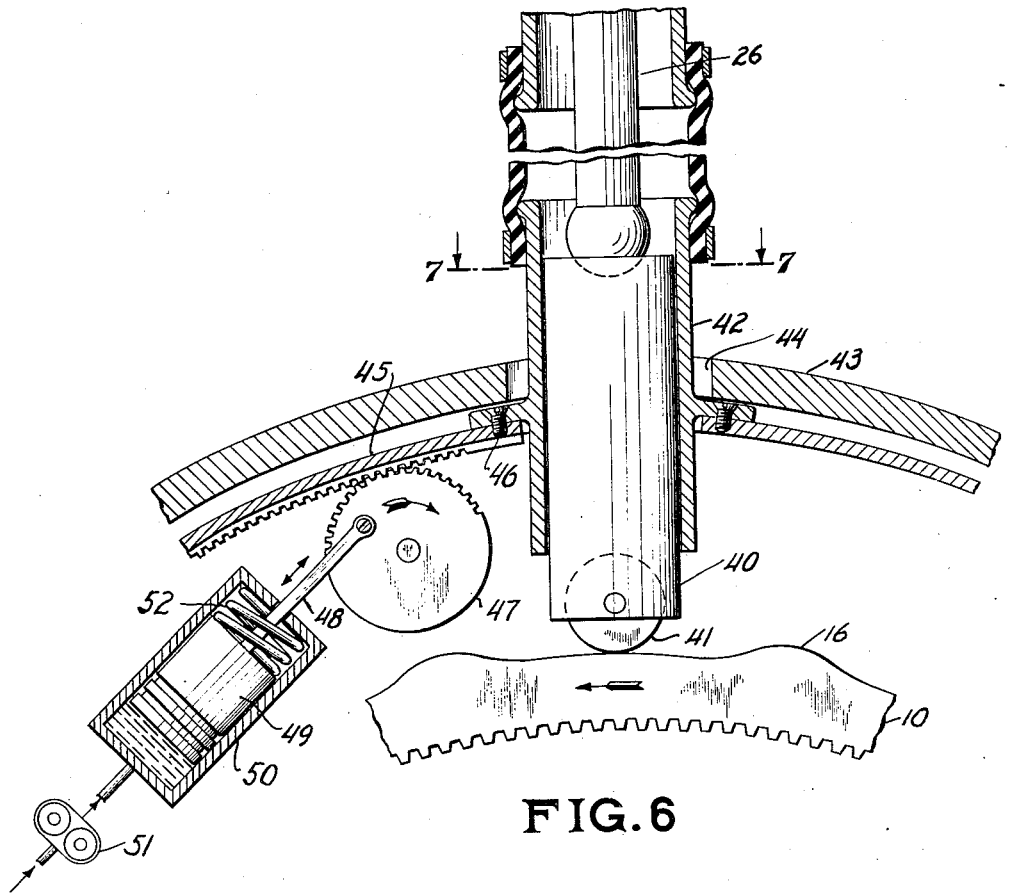
Fig. 6 is a section through a cam follower and valve actuating mechanism according to another alternate construction.

Figs. 1 and 5 show mechanisms for altering valve clearance to effect late opening of the intake valve or early closing of the exhaust valve, while Fig. 6 shows a mechanism for shifting the cam follower which is applicable either to the exhaust or intake valve according to the direction of adjustment.

Referring specifically to Fig. 1, 10 shows a sector of a multi lobe cam such as is used on radial cylinder aircraft engines, while 11 shows a portion of the engine casing to which a cam follower guide 12 and a housing 13 are secured, the guide 12 carrying a non-rotatable cam follower 14 for reciprocation therein in response to raising of the cam follower roller 15 by a cam lobe 16. The follower 14 comprises a cylinder whose top face is slanted as at 17 and includes a bottom drilling 18 communicating with a pressure oil passage 19 adapted to be fed from an engine driven fluid pump 20 which is driven by the engine by means not shown. Within the cylinder of the cam follower 14 is a piston 21 which is reciprocable both with and with respect to the cam follower, this piston having an orifice 22 which, when fluid pressure is impressed within the cylinder, uncovers the face 17 as the piston is raised in the follower, thereby providing an overflow for pressure fluid and limiting the extent to which the piston may be raised relative to the cam follower. The piston includes elongated gear teeth 23 at its upper end engaged for rotative adjustment by teeth 24 of a bar 25 mounted for lateral adjustment in the housing 13, and the piston is also provided on its top face with a spherical recess engaged by a valve actuating push rod 26.

In normal operation, the piston 21 will be rotated by the bar 25 so that the orifice is disposed opposite the uppermost part of the slanted face 17. As the engine operates, the pump 20 will provide sufficient fluid to hold the piston 21 in an elevated position with respect to the cam-follower to maintain minimum valve clearance while reciprocating therewith. Under idling conditions, however, the bar 25 may be adjusted to turn the piston 21 so that the orifice 22 uncovers a relatively lower point on the slanted cylinder face 17 whereby valve clearance is increased with consequent retarding of the intake valve opening or advancing of exhaust valve closing.

In Fig. 5, the cam follower 14 includes a top abutment 30 against which the piston 21 may abut, thus forming a positive stop. When the pump 20 is in operation the cylinder of the cam-follower 14 is filed with pressure fluid, holding the piston 21 against the stop 30 for minimum valve clearance as is desired during normal engine operation. When the engine is throttled down for idling, or when the engine is stopped, the pump 20 will be disconnected or the delivery thereof bypassed or throttled in a suitable manner so that little or no pressure fluid is delivered to the cam follower cylinder. A pump bypass is shown at 60 wherein 61 is a spring loaded relief valve having a bleed orifice 62 through which pumped fluid leaks at low engine speed without affecting the valve tappet. As engine and pump speed increase, the pump delivery is too great to pass the orifice 62 unless the pressure be raised substantially; this pressure rise raises the piston 21 in the cam follower and excess pressure is relieved through the spring loaded valve 61. At low engine speeds, pump pressure is low and the piston 21 will drop in the cam follower to allow of a greatly increased valve operating clearance to the end that intake valve opening may be retarded or exhaust valve closing advanced. Fig. 5 also shows a pump 31 adapted to deliver oil through passages 32, 33, and 34 to the hollow push rod 26 for ultimate lubrication of the valve gear, without influencing the clearance adjustment feature afforded by the pump 20.

Figure 7:
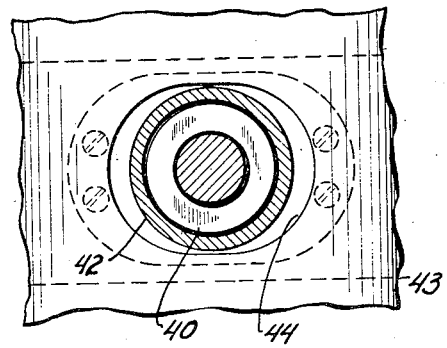
Fig. 7 is a section on the line 7—7 of Fig. 6.

In Fig. 7 we show a solid cam follower 40 having a roller 41 engageable with the cam 10 and mounted for reciprocation in a cam follower guide 42. The push rod 26 directly engages the top face of the cam follower. The engine casing 43 is provided with an opening which is elongated in the plane of rotation of the cam, as shown at 44 in Fig. 7, so that the cam follower guide 42 may be bodily shifted, with the cam follower, in either an advancing or retarding direction with respect to the cam 10. To the guide 42 a segment 45 of an internal gear is secured as at 46, this being engaged by a pinion 47 which may be rotated by a piston rod 48 pivoted thereto and actuated by a piston 49 slidable in a cylinder 50. The cylinder may be selectively fed with pressure fluid from a pump 51, and a spring 52 serves to return the piston toward the head of the cylinder 50 when no fluid pressure is available from the pump 51. In the preferred arrangement, the elements 47 to 52 will be so arranged that either the intake valve timing will be retarded or the exhaust valve timing will be advanced when the pump 51 is not delivering or when the piston 49 is displaced by the spring 52, the spring 52 thus holding the valve timing in the above mentioned positions. When full pressure is delivered by the pump 51 or when the spring 52 is compressed as during full power operation of the engine, the pinion 47 will be retarded, against the action of the spring 52, to normalize valve timing for full valve overlap.

Although we have shown only one cam follower assembly in each of the several detailed embodiments of the invention, it is contemplated that a number of cam followers as in Fig. 9, appropriate to the number of cylinders in the engine, be connected in parallel so that they will be coincidentally adjusted for control of valve timing.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In engine valve operating mechanism comprising a cam, a cam follower comprising a cylinder, a valve tappet comprising a piston engaging the cylinder, means to supply fluid to said cylinder during said valve operating mechanism operation, and means responsive to high engine speed to feed pressure fluid to said cylinder to secure minimum valve clearance and responsive to low engine speed to suppress said fluid feed to secure maximum valve clearance.

2. In an engine valve operating system, a cam, a valve operating element comprising a piston, a cam follower reciprocable in the engine comprising a cylinder within which said piston is reciprocable, limit stops cooperatng between the piston and cylinder to establish two limiting positions of the piston in the cylinder, means to feed hydraulic fluid to the cam follower cylinder to hold said piston in one said limiting position, and a device to operatively disconnect said feeding means from the cam follower at low engine speeds.

3. In an engine valve operating mechanism, a cam follower comprising a cylinder, a piston reciprocable therein, stop means to limit the amount of reciprocative movement of the piston relative to the cylinder to give minimum and maximum valve clearance adjustments, and means responsive to high speed engine operation to feed pressure fluid to the cylinder to hold said piston in engagement with one of said stop means to secure minimum valve clearance, and responsive to low engine speed to suppress said fluid feed to allow engagement of said piston with the other of said stop means to attain maximum valve clearance.

4. In an engine valve operating mechanism, a cam, a valve operating assembly comprising a cylinder element and a piston element reciprocable therein, one said element being actuated by the cam and the other being operatively connected to the valve, limit stops in the valve operating assembly establishing a minimum valve clearance position and a maximum valve clearance position respectively determined by the relative positions of said piston in said cylinder, means to feed hydraulic fluid to said cylinder to hold the piston in the position for minimum valve clearance, and a device responsive to low engine speed for suppressing said feeding means whereby the piston moves in the cylinder to the position for maximum valve clearance.

5. In an engine valve operating mechanism, in combination, a cam, a hydraulic pressure operated extendible valve tappet assembly operated by the cam, said assembly when hydraulically extended maintaining minimum valve clearance and when retracted due to lack of hydraulic feed thereto affording maximum valve clearance, means responsive to engine operation at normal speeds to maintain hydraulic pressure on said tappet assembly, and means responsive to low engine speeds, such as idling speed, to suppress the hydraulic pressure exerted on said tappet assembly.

6. In an engine valve operating mechanism, a cam, a valve tappet assembly actuatable by said cam and extendible under hydraulic pressure to provide minimum clearance in said mechanism, engine driven means operable to supply fluid under pressure to said assembly to provide said minimum clearance, and a leakage path operable to by-pass a portion of the fluid supplied by said engine drive means, said leakage path being ineffective at high engine speeds but effective at low engine speeds to provide sufficient leakage of the fluid supplied by said engine driven means to render said fluid incapable of maintaining said minimum clearance upon cam actuation.

EROLD F. PIERCE.
FRANCIS J. WIEGAND.